May 15, 1962 S. G. BEST 3,034,583
COLLECTIVE PITCH BIAS
Filed Dec. 22, 1959 2 Sheets-Sheet 1

INVENTOR
STANLEY G. BEST

BY
ATTORNEY

May 15, 1962 S. G. BEST 3,034,583
COLLECTIVE PITCH BIAS
Filed Dec. 22, 1959 2 Sheets-Sheet 2

FIG. 2

INVENTOR
STANLEY G. BEST
BY *Russell M. Lipes, Jr.*
ATTORNEY

United States Patent Office 3,034,583
Patented May 15, 1962

3,034,583
COLLECTIVE PITCH BIAS
Stanley G. Best, Manchester, Conn., assignor to United Aircraft Corporation, East Hartford, Conn., a corporation of Delaware
Filed Dec. 22, 1959, Ser. No. 861,396
10 Claims. (Cl. 170—135.74)

This invention relates to gas turbine engine fuel controls, more particularly to a fuel control for a helicopter gas turbine engine.

An object of this invention is to provide an improved fuel control for a helicopter gas turbine engine.

Another object of the invention is to provide a helicopter gas turbine engine fuel control which affords maximum stability of engine operation and at the same time gives accurate regulation of fuel flow to the engine.

Another object of the invention is to provide a fuel control for a helicopter gas turbine engine which achieves better equalization of the load between the engines in a multi-engine installation.

Another object of the invention is to provide a fuel control for a helicopter gas turbine engine which utilizes a signal of collective pitch to accurately regulate fuel flow to the engine.

Another object of the invention is to provide a signal of selected collective pitch to a helicopter gas turbine engine fuel control so that the control can anticipate actual collective pitch changes and regulate fuel flow to the engine accordingly.

Still another object of the invention is to provide a helicopter gas turbine engine fuel control which utilizes a signal of collective pitch to afford better load sharing between the engines in a multi-engine installation.

Other objects and advantages will be apparent from the following specification and claims, and from the accompanying drawings which illustrate an embodiment of the invention.

In the drawings:

FIG. 2 is a schematic illustration of the fuel control.

Figure 1:
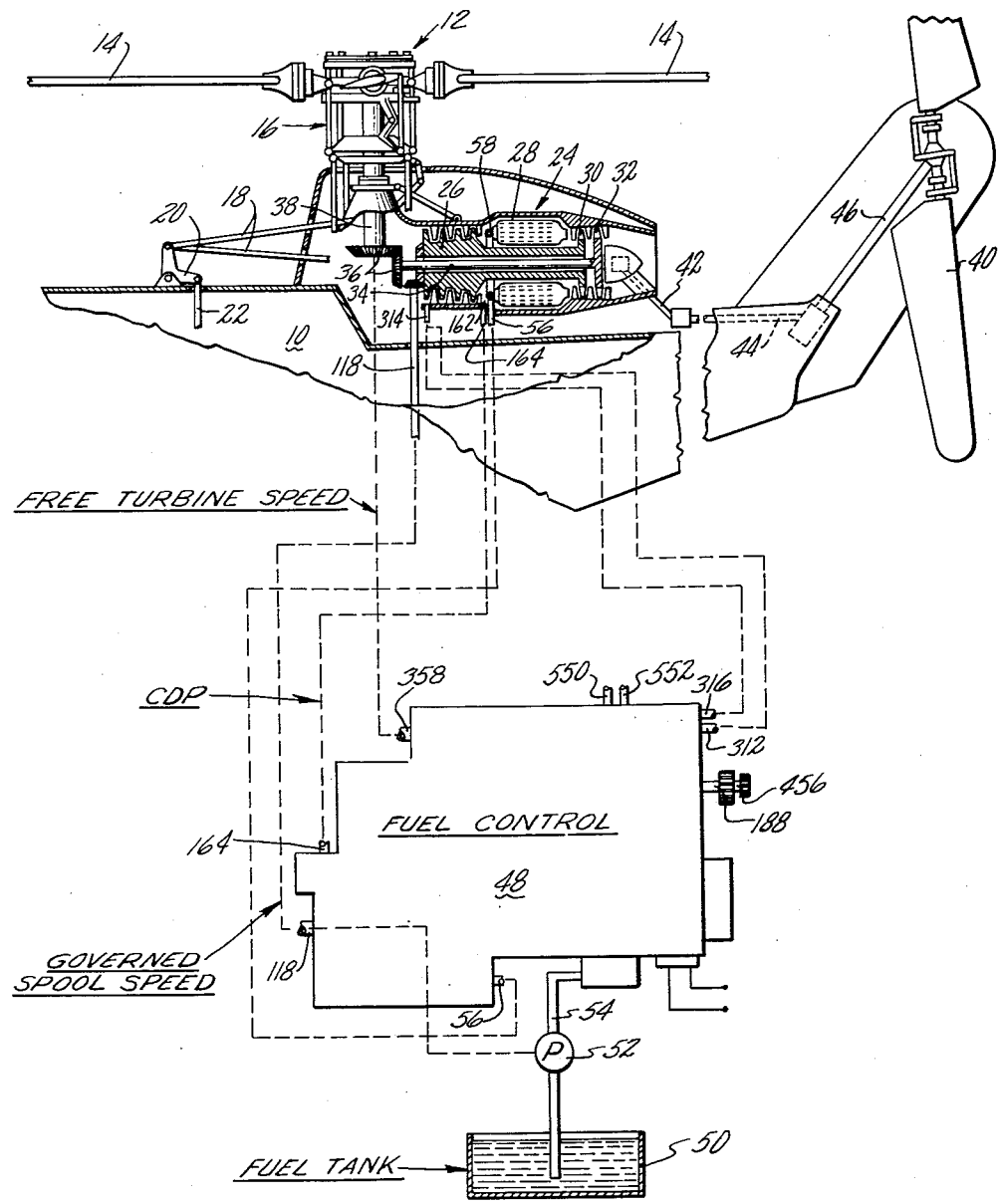
FIG. 1 is a fragmentary view of a gas turbine powered helicopter having a fuel control in accordance with my invention.

Referring to FIG. 1 in detail, a typical gas turbine engine installation for a helicopter is illustrated. A fragmentary portion of the helicopter is indicated at 10, the helicopter having main rotor 12 including variable pitch blades 14 whose pitch is controlled through linkage 16 and control links 18. The variable pitch linkage is connected through bell crank 20 and link 22 to the pilot's collective pitch stick, not shown. The particular operation of the collective pitch control system is more clearly illustrated in Patent No. 2,811,324 which issued October 29, 1957, for Turbo-Jet Driven Helicopter.

The gas turbine engine is generally indicated at 24 and includes compressor 26, combustion section 28, high pressure turbine 30 and low pressure turbine 32. High pressure turbine 30 is connected to and drives compressor 26, but has no mechanical connection with low pressure turbine 32. The low pressure turbine is mounted on shaft 34 and through gears 36 drives shaft 38 connected to main rotor 12. The low pressure turbine also drives tail rotor 40 through shafts 42, 44 and 46.

Since low pressure turbine 32 has no connection with the remainder of the engine it is referred to as a free turbine and the speed of the free turbine will be referred to hereinafter as $N_F$. The speed of the high pressure turbine 30 and compressor 26 unit is governed or regulated by fuel control 48 as will be explained, and will be referred to hereinafter as $N_G$.

Fuel in tank 50 is pumped by engine driven pump 52 through conduit 54 to fuel control 48 where fuel for the engine is metered in accordance with various parameters. Metered fuel flows through conduit 56 to ring manifold 58 in combustion section 28 of the engine from which it is distributed to the combustion section burners.

Details of fuel control 48 are shown in FIG. 2. Pumped fuel in conduit 54 enters filter chamber 60 and flows through the center of fine mesh filter 62 to passage 64. The fuel then flows through passage 66 to throttle valve chamber 68. Here the fuel is metered in accordance with various parameters, metered fuel flowing through passage 70 to shutoff and minimum pressure valve 72 and then through passage 74 to conduit 56 and the combustion section burners in engine 24.

In filter chamber 60 a small quantity of unmetered fuel flows through fine mesh filter 62, passage 76 and passage 78 to the servo system of the control as will be explained. Spring loaded bypass relief valve 80 is interposed in a passage connecting filter chamber 60 upstream of the filter and passage 78 and assures a supply of fuel to the servo system in the event that fine mesh filter 62 becomes clogged.

The throttle valve includes fixed liner 82 having one or more ports 84 therein, and cylinder 86 adapted to slide within the fixed liner and having ports 88 designed to cooperate with the ports in the fixed liner to define the effective metering area of the valve. Fuel admitted to throttle valve chamber 68 passes through one or more openings 90 in the lower end of cylinder 86 into the interior of the cylinder. The longitudinal position of the cylinder is adjusted to vary the relative positions of ports 84 and 88 which varies the effective area of the metering valve and determines fuel flow to the engine.

Adjustment of the longitudinal position of the throttle valve cylinder is accomplished by variation of servo pressure in chamber 92 below piston 94 which is affixed to the lower end of cylinder 86 and which is guided by the wall of throttle valve chamber 68. The servo pressure is controlled by throttle pilot valve 96 which has land 98 thereon controlling the admission of servo pressure to, or the venting of servo pressure from, chamber 92 through passage 110 in accordance with movement of the throttle pilot valve. Branch passage 112 is connected to servo system passage 78 and admits servo system pressure to groove 114 on the throttle pilot valve above land 98.

When the throttle pilot valve moves downward, servo pressure is admitted to passage 110 and chamber 92 to raise the throttle valve cylinder, and when the pilot valve moves upward the servo pressure in the passage and chamber is vented to the interior of the fuel control through port 116 to lower the throttle valve cylinder.

Throttle pilot valve 96 is constantly rotated during operation of the engine to reduce friction and thus keep hysteresis low. The rotational movement is imparted to the throttle pilot valve from shaft 118 which is connected to and driven by the high pressure turbine 30 and compressor 26 unit in engine 24. Spiral gear 120 mounted on the shaft meshes with spiral gear 122 on the outer surface of cage 124. Yoke 126 is connected to the lower end of throttle pilot valve 96 and extends through slot 128 in the wall of cage 124. This connection provides drive for the throttle pilot valve from the cage and also permits relative axial movement of the throttle pilot valve when its position is shifted as will be explained below.

Movement of throttle valve cylinder 86 in a downward direction decreases the effective metering area of ports 84 and 88 and thus decreases fuel flow to the engine, while movement of the cylinder in an upward direction increases effective metering area and fuel flow to the engine. Adjustable stop 130 limits downward travel of the cylinder and thus limits minimum fuel flow to the engine.

Compensation for fuel density variations resulting from fuel temperature changes is accomplished by rotating throttle valve cylinder 86. Adjustment screw 132 is threaded to one end of Invar rod 134 which is connected at its opposite end to arm 136. The arm is mounted on shaft 138 which is eccentrically connected to roller 140 fitted within slot 142 in the wall of cylinder 86. Initial adjustment of the compensator is made by means of adjustment screw 132. When fuel temperature changes occur, rod 134 expands or contracts and through its linkage rotates movable cylinder 86 to rotationally displace metering ports 84 and 88 with respect to each other.

A constant pressure drop across the throttle valve is maintained by a pressure regulating valve. The pressure regulating valve includes piston valve 144 which is connected at one end to diaphragm 146. The upper surface of the diaphragm is subject to throttle valve inlet or unmetered fuel pressure by means of branch passage 148 connected to passage 66 between filter chamber 60 and throttle valve chamber 68. The lower surface of the diaphragm is subject to throttle valve outlet or metered fuel pressure by means of branch passage 150 which is connected to metered fuel passage 70 between the throttle valve chamber and shutoff and minimum pressure valve 72. In addition to the metered fuel pressure acting on the lower side of the diaphragm, spring 152 loads the diaphragm and piston in an upward direction.

Movement of the pressure regulating valve, piston valve and diaphragm in a downward direction due to an increase in unmetered fuel pressure or a decrease in metered fuel pressure bypasses unmetered fuel through groove 154 in piston valve 144 to passage 156 and the interior of the fuel control to reduce unmetered fuel pressure and reduce the pressure drop across the throttle valve to its desired value. Conversely, a reduction in unmetered fuel pressure or an increase in metered fuel pressure raises the piston valve and diaphragm to reduce bypass flow and increase unmetered fuel pressure to increase the pressure drop across the throttle valve to its desired value.

Fuel control 48 can be accommodated to different fuels by variation of the loading on pressure regulating valve spring 152. The position of lower abutment 158 for the spring is adjustable by means of screw 160. Thus, for differences in specific gravity between fuel batches, screw 160 is turned to shift the position of lower abutment 158 and vary the spring loading.

Compressor discharge pressure absolute is used by the fuel control as a fuel metering parameter. Pressure station 162 (FIG. 1) is located in the engine adjacent the discharge for compressor 26 and is connected by conduit 164 to the interior of bellows 166 (FIG. 2) within fuel control 48. Stem 168 extends from the free end of the bellows and is connected at its midportion to one end of lever 170 which rotates about a fixed pivot. The opposite end of the lever is connected to the free end of evacuated bellows 172. Lever 170 thus is rotated about its pivot in accordance with compressor discharge pressure absolute, and its movement is transmitted through stem 168 to one end of lever 174 which rotates about a fixed pivot. Lever 174, in turn, rotates about its pivot to raise or lower roller assembly 176 located adjacent the other end of the lever. Up and down motion of roller assembly 176 is transmitted to one end of lever 178 which rotates about a fixed pivot, the opposite end of the lever contacting ball 180 on the upper end of throttle pilot valve 96.

Expansion or contraction of compressor discharge pressure responsive bellows 166 thus acts through a series of levers to actuate throttle pilot valve 96. When bellows 166 expands, lever 170 is rotated in a clockwise direction, lever 174 is rotated in a counterclockwise direction and lever 178 is rotated in a counterclockwise direction to lower the throttle pilot valve. This admits servo pressure to chamber 92 to move throttle valve cylinder 86 upward and increases metering valve area and fuel flow to the engine. Conversely, contraction of bellows 166 rotates the levers so that throttle pilot valve 96 is raised and servo pressure reduced in chamber 92. The throttle valve cylinder then will move downward to decrease metering valve area and fuel flow to the engine.

Cage assembly 182 extends upward from throttle valve cylinder 86 and is affixed to the upper edge of the cylinder by bolt 184 which also holds piston 94 against the lower edge of the cylinder. The cage assembly supports spring 186 which is connected to lever 178. The cage assembly and spring provide a follow-up for nulling out the throttle valve servo system.

Engine $N_G$ speed, that is the speed of the high pressure turbine 30 and compressor 26 unit, and compressor inlet temperature also are used by the control as fuel metering parameters. Roller assembly 176 between levers 174 and 178 is positioned in accordance with $N_G$ speed and compressor inlet temperature, and shifting of the position of the roller assembly varies the mechanical advantage of levers 174 and 178 to vary the input signal to throttle pilot valve 96, and in turn the position of throttle valve cylinder 86 and thus fuel flow to the engine.

The pilot's power lever, not shown, is connected to alpha control shaft 188 which has $N_G$ speed set cam 190 mounted thereon. The surface of the cam contacts a roller on $N_G$ speed set arm 192, the lower end of the arm having a fixed pivot and the upper end of the arm being connected to one end of conecting link 194. The other end of the connecting link is connected to trim adjustment link 196 which has a pivoted connection 198 with trim lever 210 and $N_G$ set lever 212. Roller 214 on trim lever 210 travels along the surface of adjustment plate 216 when the linkage is moved. $N_G$ set lever 212 has a relatively fixed pivot 218 and the lower end of the lever has a pivoted connection 220 with the upper portion of droop lever 222. While it is not clear from the schematic drawing, the shape of $N_G$ set lever 212 and its connection with trim lever 210 are such that the $N_G$ set lever is rotated about relatively fixed pivot 218 when the $N_G$ speed set linkage is moved. The lower end of droop lever 222 has roller 224 mounted thereon which is guided in slot 226 in droop cam 228, the cam being rotatable about fixed pivot 230. The upper end of droop lever 222 contacts projection 232 on $N_G$ speed lever 234. Idler lever 236 is connected to droop cam pivot 230 and provides a space pivot for pivot 220 between $N_G$ lever 212 and droop lever 222.

Idler stop 238 is located to contact $N_G$ speed set arm 192 and limit movement of the $N_G$ speed set linkage in a speed decrease direction. In addition, military trim adjustment 240° and side trim adjustment 242 permit change of the slope of adjustment plate 216 to permit limited variation of these two engine ratings.

A signal of the actual $N_G$ speed is obtained from an $N_G$ governor which is connected to and driven by the high pressure turbine 30 and compressor 26 unit. $N_G$ governor 244 is gear driven from shaft 118 and includes flyweights 246. The inner ends of the flyweights contact pilot valve 248 and the pilot valve is loaded against the flyweights by speeder spring 250. A yoke connection, not shown, between governor cage 252 and the pilot valve imparts rotational movement to the pilot value to reduce friction and thus keep hystersis low.

Pilot valve 248 controls the admission of servo pressure to an $N_G$ servo. Branch passage 254 is connected to servo system branch passage 112 and through it servo system pressure is admitted to groove 256 on the pilot valve. Land 258 controls the opening into servo pressure passage 260 connected to chamber 262 at one end of $N_G$ servo piston assembly 264. The $N_G$ servo piston assembly includes piston 266 in the housing defining chamber 262 and piston 268 in the housing defining chamber 270, the two pistons being connected by rod 272. Servo system pressure is admitted to chamber 270 through branch passage 274 from servo system branch passage 112 and the pressure in this chamber opposes the servo pressure in chamber 262. Rod 272 is connected to the upper end of $N_G$ speed lever 234 which rotates about a fixed pivot at its lower end.

A feedback is provided between the $N_G$ governor and the $N_G$ servo for nulling out the servo system. $N_G$ feedback lever 276 is connected at its lower end to abutment 278 for speeder spring 250. The feedback lever rotates about adjustable pivot 280 and at its upper end is in contact with pin 282 on $N_G$ servo piston assembly rod 272. By variation of the position of pivot 280, the position and rate of $N_G$ feedback lever 276 can be varied. The position of the feedback lever can be shifted by position adjustment 284 and the rate of the feedback lever can be changed by rate adjustment 286.

Rotation of $N_G$ speed set cam 190 acts through its associated linkage to position throttle valve cylinder 86 and thus establish a selected fuel flow and a selected speed for high pressure turbine 30 and compressor 26 unit. By virtue of $N_G$ speed set cam 190 and its associated linkage, and $N_G$ governor 244 and its associated servo, droop cam 228 is positioned in accordance with the difference between $N_G$ selected speed and $N_G$ actual speed, i.e., $N_G$ speed error. Roller-type follower 288 rides the surface of droop cam 228 and is connected to droop cam lever 290. The upper end of the droop cam lever is fixedly pivoted at 292 and the lower end of the droop cam lever is connected to one end of link 294 which includes a retainer for roller assembly 176 at its other end.

Upon a change in selected $N_G$ speed or upon a variation in actual $N_G$ speed, droop cam 228 is rotated and a shift in the position of link 294 and roller assembly 176 results. This varies the lever ratio of levers 174 and 178 to cause movement of throttle pilot valve 96. As has been described above, movement of the throttle pilot valve results in a change in the position of throttle valve cylinder 86 and a change in fuel flow to the engine thereby maintaining the speed of high pressure turbine 30 and compressor 26 unit at the level selected by the position of $N_G$ speed set cam 190. Thus, the position of the $N_G$ cam establishes the power output of the gas turbine and hence the power available to drive main rotor 12.

Three dimension cam 296 is mounted on rod 272 of $N_G$ servo piston assembly 264. The cam is translated when the servo piston assembly is translated in response to a signal of actual $N_G$ speed from $N_G$ governor 244, and it is rotated in accordance with compressor inlet temperature as will be described.

Compressor inlet temperature sensing bellows 298 is mounted within chamber 310 in fuel control 48. Inlet conduit 312 connects the chamber and bleed station 314 at the inlet to compressor 26, and return conduit 316 also connects the chamber and a bleed return station at the inlet to the compressor. Aspirator 318 is located in return conduit 316 adjacent chamber 310 and is connected to the discharge of compressor 26. The aspirator is used to induce a sufficient flow of compressor inlet air through chamber 310 to derive a compressor inlet temperature.

Follower 320 is connected to the free end of bellows 298 and contacts one end of lever 322 which rotates about roller pivot 324. The position of the roller pivot can be changed by adjusting screw 326 to vary the rate of the lever. The other end of the lever is connected to flapper valve 328 in temperature sensing servo piston 330. The flapper valve controls the bleeding of servo pressure from chamber 332 above the piston. Servo system pressure is admitted to chamber 334 below temperature sensing servo piston 330 through branch passage 336 which is connected to servo system passage 78. Servo system pressure in chamber 334 is admitted to chamber 332 through piston passage 338, orifice 340 being located in the passage. The temperature sensing servo piston 330 is connected by link 342 to rack 344, the rack meshing with pinion 346 which is integral with cam 296.

Expansion or contraction of compressor inlet temperature sensing bellows 298 varies the servo pressure in chamber 332 to regulate the position of temperature sensing servo piston 330. Variation in the position of the piston results in a change in the rotational position of cam 296.

Temperature reset crank 348 is in contact at one end with the surface of cam 296 and the other end of the crank serves as the relatively fixed pivot for $N_G$ set lever 212. The temperature reset crank provides a compressor inlet temperature bias for the $N_G$ set lever, varying the relative position of pivot 218 for the lever, and resulting in a corrected $N_G$ input signal being delivered to droop cam 228.

Cam follower 350 also is in contact with the surface of cam 296 and provides an acceleration limit for the engine as a function of $N_G$ speed and compressor inlet temperature. The cam follower rotates about fixed pivot 292 and has projection 352 thereon which is adapted to be contacted by adjustable abutment 354 on droop cam lever 290. The lever arrangement is such that movement of the droop cam lever in a counterclockwise direction about pivot 292, which would increase fuel flow to the engine, may be limited or controlled by the acceleration cam follower.

A signal of free turbine speed ($N_F$) is derived and used by the fuel control to bias the $N_G$ speed set linkage in a decrease speed direction if $N_F$ speed should exceed a selected value. $N_F$ governor 356 is connected by flexible shaft 358 to main rotor shaft 38 (FIG. 1). The governor includes flyweights 360 the inner ends of which contact chopper-type pilot valve 362 which is loaded against the flyweights by speeder spring 364. A yoke connection, not shown, between the governor cage and the pilot valve imparts rotational movement to the pilot valve.

Pilot valve 362 controls the admission of servo pressure to an $N_F$ servo. Branch passage 366 is connected to servo system branch passage 112 and servo system pressure is admitted through the branch passages and orifice 368 to chamber 370 containing $N_F$ servo pressure regulating valve 372. The servo pressure regulating valve is loaded against servo pressure by spring 374 and its purpose is to maintain a constant pressure in regulated servo pressure passage 376 connecting servo pressure regulating valve chamber 370 and groove 378 on pilot valve 362. The purpose of the servo pressure regulating valve is to insure accuracy of the $N_F$ governor system and to prevent drift. Land 380 on the pilot valve controls the opening into servo pressure passage 382 which is connected by longitudinal slot 384 in the pilot valve, as the pilot valve rotates, to servo pressure passage 386 connected to chamber 388 at one end of $N_F$ servo piston assembly 390. The $N_F$ servo piston assembly includes piston 392 in the housing defining chamber 388 and piston 394 in the housing defining chamber 396, the two pistons being connected by rod 398. Regulated servo system pressure is admitted to chamber 396 through branch passage 410 from passage 376 and the pressure in this chamber opposes the servo pressure in chamber 388. The midportion of rod 398 is connected to the lower end of output lever 412 which rotates about pivot 414 at its upper end. The vertical position of pivot 414 is adjustable to vary the rate of the output lever.

Pin 416 on the midportion of output lever 412 contacts adjustable abutment 418 on reset lever 420. The lower end of the reset lever is relatively fixed at pivot 422 and the upper end of the reset lever is adapted to contact shoulder 424 on $N_G$ speed set connecting link 194. The $N_F$ governor linkage is so designed that it can shift the $N_G$ speed set linkage in a speed decrease direction, but it will have no effect upon the linkage in a speed increase direction to establish a speed for the gas turbine higher than the operating speed established by the $N_G$ cam. That is, the $N_F$ governor linkage cannot shift the $N_G$ speed set linkage in a speed increase direction when to do so would establish a gas turbine speed greater than the speed selected by the $N_G$ cam.

A feedback is provided between the $N_F$ governor and the $N_F$ servo for nulling out the servo system. $N_F$ feedback lever 426 has relatively fixed pivot 428 about which it rotates. The lower end of the feedback lever contacts pin 430 on $N_F$ servo piston assembly rod 398 and the upper end of the feedback lever contacts pin 432 on abutment 434 for speeder spring 364. Upon displacement of the $N_F$ servo piston assembly, the feedback lever is rotated to vary the loading of speeder spring 364 and restore pilot valve 362 to its equilibrium position.

$N_F$ cam 436 is mounted on alpha control shaft 188 along with $N_G$ speed set cam 190. A roller on the surface of spring-loaded cam follower rod 438 engages the surface of the $N_F$ cam and causes longitudinal displacement of the cam follower rod when the cam is rotated. Pin 442 on the cam follower rod contacts the lower end of arm 440 which has a fixed pivot 444 at its upper end. The midportion of arm 440 contacts pin 446 on rate adjustment link 448. One end of the rate adjustment link is slidably connected to adjustable shoulder 450 and the other end of the link defines relatively fixed pivot 428 for $N_F$ feedback lever 426. By means of the $N_F$ cam and its linkage connection through the $N_F$ feedback lever with the $N_F$ governor, an $N_F$ speed limit is scheduled when the alpha control shaft is rotated and $N_G$ speed is scheduled. The load on spring 364 is a setting determined by the rotation of $N_F$ cam 436. The load set on spring 364 determines the position of the $N_F$ servo piston assembly 390, and hence the positions of pin 416 and the end of lever 420 are $N_F$ governor settings. By means of the $N_F$ governor and its linkage connection with the $N_G$ speed scheduling linkage, an $N_F$ overspeed condition tends to displace the $N_G$ speed set linkage in a speed decrease direction.

The position of fixed pivot 444 for arm 440 can be adjusted through coarse adjustment 452 and fine adjustment 454, and the position of adjustable shoulder 450 is adjustable to vary the rate of link 448.

The pilot's collective pitch stick, not shown, is connected to beta control shaft 456 which is shown concentrically located within alpha shaft 188. Collective pitch cam 458 is mounted on the beta control shaft and is contacted by a follower on collective pitch idler 460. The idler pivots about a fulcrum which is adjustable to vary the lever ratio of the idler, and the lower end of the idler is connected to follower rod 462 which has a lost motion connection with pivot 422 on $N_F$ reset lever 420. By virtue of the collective pitch cam and its associated linkage, the $N_F$ linkage is biased by altering the position of lever 420 whenever the collective pitch stick and beta control shaft 456 are actuated. The collective pitch input to the control, therefore, serves as an anticipation of actual blade angle changes of the rotor and thus rotor load changes.

Provision is made in fuel control 48 to prevent fuel flow to the engine and to unload the pump during windmilling operation of the helicopter. Windmill bypass cam 464 is mounted on alpha control shaft 188. The surface of the cam is contacted by a roller on pivotable follower 466 which contacts rod extension 468 on pilot valve 470 in the windmill bypass servo. Land 472 on the pilot valve controls the discharge of metered fuel through branch passage 474, which is connected to branch passage 150, to the interior of the fuel control and thus to drain, and land 476 on the pilot valve controls the admission of servo system pressure in branch passage 478, which is connected to branch passage 274, to passage 480 connecting the servo and spring chamber 482 behind shutoff and minimum pressure valve 72.

During initial rotation of the windmill bypass cam, pilot valve 470 is positioned to the left by the cam to dump metered fuel within the fuel control, and groove 484 on the pilot valve connects branch passage 478 and passage 480 to deliver servo system pressure to chamber 482. This insures that the shutoff and minimum pressure valve is held closed and that no fuel is delivered to the engine, and it also protects the fuel pump against overloading. As the power lever is advanced, windmill bypass cam 464 rotates and pilot valve 470 can be spring loaded to the right to cut off the flow of metered fuel through branch passage 474 and to vent passage 480 and chamber 482 to drain connection 486.

Electric override torque motor 488 is incorporated in the fuel control and includes an electromagnetic device selectively rotating link 490 about pivot 492. The upper end of the link defines flapper valve 494 which controls servo pressure in chamber 496 at one end of an electric override servo piston assembly. The servo piston assembly includes piston 498 in the housing defining chamber 496 and piston 510 in the housing defining chamber 512, the two pistons being connected by rod 514.

Servo system pressure in branch passage 336 is admitted through branch pasage 516 and orifice 518 to chamber 520 containing electric override servo pressure regulating valve 522. The servo pressure regulating valve, like $N_F$ servo pressure regulating valve 372, maintains a constant pressure in regulated servo pressure passage 524 and chamber 512. Servo pressure is admitted to chamber 496 from chamber 512 through passage 526 and orifice 528 within rod 514.

Motion of the electric override servo piston assembly due to variations in servo pressure in chamber 496 is transmitted to overspeed limit lever 530 which rotates about fixed pivot 532. The upper end of the overspeed limit lever is pivotably connected at 534 to the end of connecting link 194 by a pivot whose position can be adjusted. The connection between the servo piston assembly and the overspeed limit lever is such that the overspeed limit lever will be rotated by the piston assembly only in a clockwise direction to drive the $N_G$ speed set linkage in a speed decrease direction, there being no provision for driving the lever in a counterclockwise direction. Follow-up is provided between overspeed limit lever 530 and flapper valve 494 by spring 536 to null the electric override servo system.

The $N_G$ and compressor inlet temperature positioned cam 296 on $N_G$ servo piston assembly 264 can be used as the source of a signal for driving a variable geometry actuator such as a controllable inlet guide vane device. Follower 538 is provided for such a purpose and has one end in contact with the cam surface and the other end in contact with one end of lever 540. The midportion of lever 540 is connected to variable geometry actuator pilot valve 542 and the other end of the lever contacts variable geometry feedback cam 544. The pilot valve controls the admission of servo system pressure from branch passage 548, which is connected to branch passage 336, to either conduit 550 or conduit 552 which are connected to a variable geometry actuator, not shown. A feedback from the variable geometry actuator is provided by lever 554 and rod 556 which are connected to feedback cam 544. The feedback acts to restore pilot valve 542 to its equilibrium position.

*Operation*

To start the engine, alpha control shaft 188 is rotated beyond the position in which windmill bypass cam 464 is effective to admit servo pressure to close shutoff and minimum pressure valve 72 and to dump metered fuel within the fuel control. Rotation of the alpha control shaft rotates $N_G$ speed set cam 190 to select the speed of the high pressure turbine 30 and compressor 26 unit in gas turbine engine 24, and simultaneously rotates $N_F$ cam 436 to schedule the maximum speed of low pressure turbine 32 and the connected main rotor 12. The $N_G$ speed set cam acts through its linkage to rotate droop cam 228, and droop cam lever 290, through displacement of roller assembly 176, varies the lever ratio of the lever system associated with throttle pilot valve 96 to move the pilot valve from its equilibrium position. Changing of the position of the pilot valve varies the servo pressure below throttle valve piston 94 to move throttle valve cylinder 86 and regulate fuel flow to the engine.

Throttle valve area is regulated as a function of compressor discharge pressure absolute, the actual speed of the $N_G$ unit in the engine and compressor inlet temperature. Compressor discharge pressure sensing bellows 166 acts through its lever system upon changes in compressor discharge pressure absolute to move throttle pilot valve 96 and produce a resulting shift in the position of throttle valve cylinder 86. An increase in compressor discharge pressure will increase the effective metering area of throttle valve ports 84 and 88 and fuel flow to the engine, and a decrease in compressor discharge pressure will decrease the effective metering area of the ports and fuel flow to the engine.

$N_G$ governor 244 senses the actual speed of the high pressure turbine 30 and compressor 26 unit in engine 24 and through its servo translates $N_G$ servo piston assembly 264 to position droop cam 228 in accordance with actual $N_G$ changes. An increase in actual $N_G$ speed from the selected $N_G$ speed results in a reduction in throttle valve port area, and a decrease in actual $N_G$ speed from the selected $N_G$ speed results in an increase in area. The $N_G$ governor and its servo system always operate upon fuel flow to restore actual $N_G$ speed to its selected value. In addition to rotating the droop cam, translation of the $N_G$ servo piston assembly also translates three dimension cam 296.

Compressor inlet temperature sensing bellows 298 acts through its servo upon changes in compressor inlet temperature to rotate cam 296. The cam, which is translated by actual $N_G$ and rotated by compressor inlet temperature, is contoured in a predetermined fashion to produce either an increase or a decrease in fuel flow as the cam is moved in either of its motions.

Temperature reset crank 348 in contact with the surface of cam 296 biases the pivot of $N_G$ set lever 212 so that the $N_G$ speed set signal delivered to the droop cam is a signal of corrected $N_G$ speed.

Cam follower 350 also in contact with the surface of cam 296 determines through adjustable abutment 354 fuel flow to the engine during acceleration to control the rate at which fuel flow is increased in accordance with actual $N_G$ speed and compressor inlet temperature. The adjustable abutment limits movement of droop cam lever 290 in a counterclockwise or fuel increase direction upon an increase selected speed signal to droop cam 228.

During operation of the engine and the helicopter, $N_F$ governor 356 acts as a limiter upon the maximum speed of main rotor 12 and offsets any tendency of the rotor to overspeed. Through the $N_F$ servo, reset lever 420 is rotated to bias the $N_G$ speed set linkage in a speed decrease direction. In addition, collective pitch cam 458, which is operatively connected with the collective pitch stick, provides a signal to the fuel control when the pilot changes the collective pitch of blades 14 on the main rotor. This collective pitch bias permits a given accuracy in steady state operating speed to be attained with a lower sensitivity $N_F$ governor than would otherwise be required. At the same time this makes stability problems easier to overcome. In addition, the collective pitch bias improves load sharing in multi-engine installations since with less sensitive $N_F$ governing, a given error in $N_F$ setting or sensing results in less change in the $N_G$ setting. Therefore, tracking errors between engines result in smaller variations in the $N_G$ setting from engine to engine. By making all engines in a multi-engine installation run at the same value of $N_G$, the load will be equally shared by the engines.

The collector pitch bias also provides an anticipation signal to the fuel control since the fuel control mechanism is biased as the pilot changes collective pitch and the control does not have to wait for an actual change in $N_F$ speed before it responds. Rapid response thus is provided to sudden changes in selected collective pitch.

In addition to the $N_F$ limiter and the collective pitch bias in the control, electric override torque motor 488 provides additional protection to the engine. When the torque motor produces a signal which rotates link 490 in a clockwise direction, overspeed limit lever 530 is rotated in a clockwise direction to reset the $N_G$ set linkage in a fuel flow decrease direction and to reduce fuel flow to the engine.

It is to be understood that the invention is not limited to the specific embodiment herein illustrated and described, but may be used in other ways without departure from its spirit as defined by the following claims.

I claim:

1. For a helicopter gas turbine engine in which a first turbine drives a compressor and a second turbine drives a helicopter rotor with controllable pitch blades thereon, first governor means for regulating the speed of said compressor, second governor means for said helicopter rotor, means responsive to changes in the collective pitch of said rotor blades for biasing the setting of said second governor means, and means for varying the setting of said first governor means in response to errors in the speed of said helicopter rotor.

2. For a helicopter gas turbine engine in which a first turbine drives a compressor and a second turbine drives a helicopter rotor with controllable pitch blades thereon, fuel control governor means for regulating the speed of said compressor, governor means for said helicopter rotor, means responsive to changes in the collective pitch of said rotor blades for biasing the setting of said helicopter rotor governor means and means for varying the setting of said fuel control governor means in response to errors in the speed of said helicopter rotor.

3. For a helicopter gas turbine engine in which a first turbine drives a compressor and a second turbine drives a helicopter rotor with controllable pitch blades thereon, fuel control governor means for regulating the speed of said compressor, governor means for said helicopter rotor, means for manually adjusting said helicopter rotor governor means, means responsive to changes in the collective pitch of said rotor blades for biasing the setting of said helicopter rotor governor means, and means for varying the setting of said fuel control governor means in response to errors in the speed of said helicopter rotor.

4. For a helicopter gas turbine engine in which a first turbine drives a compressor and a second turbine drives a helicopter rotor with controllable pitch blades thereon, means for metering fuel flow to said engine, means responsive to the speed of said compressor for regulating said metering means, manually adjustable means for setting said compressor speed responsive means, governor means for said helicopter rotor, manually adjustable means for setting said helicopter rotor governor means, means responsive to changes in the collective pitch of said rotor blades for biasing the setting of said helicopter rotor governor means, and means for varying the setting of said compressor speed setting means in response to errors in the speed of said helicopter rotor.

5. In a gas turbine engine fuel control for a helicopter having a main rotor with controllable pitch blades thereon, fuel flow metering means, means for varying the area of said metering means in accordance with an engine operating pressure, engine speed and an engine temperature, means for scheduling engine speed and for limiting the maximum speed of said helicopter main rotor, and means responsive to the collective pitch of said main rotor blades for biasing said main rotor maximum speed limiting means when collective pitch is changed.

6. In a gas turbine engine fuel control for a helicopter having a main rotor with controllable pitch blades thereon, fuel flow metering means, means for varying the area of said metering means in accordance with an engine operating pressure, engine speed and an engine temperature, means for limiting acceleration of said engine in accordance with engine speed and said engine temperature, means for scheduling engine speed and for limiting the maximum speed of said helicopter main rotor, and means responsive to the collective pitch of said main rotor blades for biasing said fuel flow metering means.

7. In a gas turbine engine fuel control for a helicopter having a main rotor with controllable pitch blades thereon, fuel flow metering means, means for varying the area of said metering means in accordance with an engine speed, a first control shaft, means operatively connected with said first control shaft for scheduling engine speed and for limiting the maximum speed of said helicopter main rotor, a second control shaft, means operatively connected with said second control shaft for biasing said maximum speed limiting means when the collective pitch of said main rotor blades is changed, and means for biasing said engine speed scheduling means upon overspeeding of said helicopter main rotor.

8. For the combination of a helicopter having a main rotor with controllable pitch blades thereon and means for changing the collective pitch of said blades, and a gas turbine engine having a first turbine driving a compressor and a second turbine driving said main rotor; a fuel control for regulating fuel flow to said engine, said fuel control including metering means, means for varying the area of said metering means in accordance with the discharge pressure of said compressor, the speed of said compressor and the inlet temperature of said compressor, means for manually scheduling the speed of said compressor and the maximum speed of said second turbine, and means responsive to a selected change of the collective pitch of said main rotor blades for biasing said maximum speed setting means, and means for varying said compressor speed scheduling means in accordance with an overspeed of said second turbine.

9. For a helicopter having a main rotor with controllable pitch blades thereon, an engine connected to drive said main rotor means for controlling the speed of said main rotor, means responsive to the changes in the collective pitch of said rotor blades for limiting the speed of said main rotor, and means for varying the speed of said engine in response to errors in the speed of said main rotor.

10. Th combination as in claim 9 in which the means for varying the speed of said engine includes means for regulating the flow of fuel to said engine.

References Cited in the file of this patent
UNITED STATES PATENTS

| | | |
|---|---|---|
| 2,640,551 | Plumb | June 2, 1953 |
| 2,664,958 | Dancik | Jan. 5, 1954 |
| 2,856,754 | Torell | Oct. 21, 1958 |
| 2,909,895 | Farkas | Oct. 27, 1959 |